United States Patent [19]

Funk et al.

[11] Patent Number: 4,460,540
[45] Date of Patent: Jul. 17, 1984

[54] BURNABLE POISON ROD FOR A NUCLEAR REACTOR FUEL ASSEMBLY

[75] Inventors: Charles E. Funk, Penn Hills Township, Allegheny County; Andrew S. Oneufer, North Huntingdon, both of Pa.

[73] Assignee: Westinghouse Electric Corp., Pittsburgh, Pa.

[21] Appl. No.: 259,325

[22] Filed: Apr. 30, 1981

[51] Int. Cl.³ .............................................. G21C 7/10
[52] U.S. Cl. ..................................... 376/327; 376/412; 376/447; 138/149; 138/113; 403/371; 403/372
[58] Field of Search ............... 376/327, 447, 419, 412, 376/455, 445, 420, 339; 24/231, 241 S, 235, 239, 256; 403/372, DIG. 6, 371, DIG. 7; 285/321, 379; 138/113, 149; 16/2, 108

[56] References Cited

U.S. PATENT DOCUMENTS

| | | | |
|---|---|---|---|
| 2,244,977 | 6/1941 | Hansman et al. | 16/2 |
| 2,438,163 | 3/1948 | Haling | 267/161 |
| 2,727,761 | 12/1955 | Elliott et al. | 285/321 |
| 3,507,525 | 4/1970 | Sable | 403/372 |
| 3,510,398 | 5/1970 | Wood | 376/447 |
| 3,635,501 | 1/1972 | Thomsen | 285/321 |
| 4,080,253 | 3/1978 | Gesinski | 376/412 |
| 4,111,748 | 9/1978 | Hayashi et al. | 376/412 |

FOREIGN PATENT DOCUMENTS

| | | | |
|---|---|---|---|
| 1514958 | 7/1969 | Fed. Rep. of Germany | 376/412 |
| 2828975 | 1/1980 | Fed. Rep. of Germany | 376/327 |
| 2439456 | 6/1980 | France | 376/339 |
| 53-81895 | 7/1978 | Japan | 376/327 |
| 54-13895 | 2/1979 | Japan | 376/412 |
| 54-108188 | 8/1979 | Japan | 376/412 |
| 883196 | 11/1961 | United Kingdom | 376/412 |
| 1454618 | 11/1976 | United Kingdom | . |

*Primary Examiner*—Harvey E. Behrend
*Attorney, Agent, or Firm*—D. E. Erickson; Z. L. Dermer

[57] ABSTRACT

A burnable poison rod for use in a nuclear reactor fuel assembly which includes concentrically disposed rods having an annular space therebetween which extends the full length of the rods. The inner rod is hollow to permit circulation of coolant therethrough. Annular burnable poison pellets are positioned in the annular space which is closed at both ends by plugs. A spring clip is located in the plenum space above the pellet stack in the rods. The spring clip is of cylindrical configuration having a gap in the material which provides two ends adapted to be squeezed toward each other. A cross section of the clip shows that its ends contain alternating flat and round edges, the round edges conforming to the outer rod inner surface to provide a retentive force which is releasably applied to the pellet stack as it grows during operation in a reactor.

2 Claims, 9 Drawing Figures

BURNABLE POISON ROD FOR A NUCLEAR REACTOR FUEL ASSEMBLY

BACKGROUND OF THE INVENTION

The invention described herein relates to nuclear reactor fuel assemblies and more particularly to a burnable poison rod designed to protect burnable poison pellets in the rod against damage during handling and shipping.

The prior art discloses burnable poison rods which include a pair of concentrically disposed tubes having an outer diameter and length essentially the same as a fuel rod. The similarity in size permits the burnable poison rod to be positioned in aligned fuel assembly grid cells in the same manner as a fuel rod. Burnable poison pellets of boron carbide or similar neutron absorbing materials are disposed in the narrow annular space between the concentric tubes, and the space is closed at both ends by plugs welded in the tube ends. However, the hollow portion of the inner tube does not contain plugs thus permitting the unimpeded flow of coolant upwardly through the inner tube during the time of operation in a nuclear reactor.

In the concentric tube design of burnable poison rods, a positioning element is not currently used in the annular space to hold the pellets in position. However, the need exists for a pellet restraining device capable of maintaining a slight compressive force on the stack of absorber pellets as they grow in length during reactor operation. Importantly, an axially imposed force is needed to preclude or at least limit gaps between pellets that may occur during the time the fuel assembly having burnable poison rods is being shipped and handled prior to installation in a reactor. If gaps are present, and the rod is exposed to a vertically directed axial force, the weight of the stack of pellets above the gap will be applied to the pellets therebeneath thus causing fracture of the relatively fragile neutron absorber material.

Different types of springs or other restraining devices are used for holding fuel pellets against axial movement in a fuel rod. However, the thin wall of neutron absorber pellets, which is dictated by the radial dimension of the annular space between the tubes is limited in thickness, and this limitation imposes severe restrictions on the use of conventional coil springs or "C" ring clips having inwardly bent tabs which might be used for this purpose.

These designs of springs and clips are not suitable for concentric tube rod designs because the wire size in a coil spring that will fit between the tubes is too small in diameter to provide the required force necessary to hold the pellet stack under some degree of compression. Also, the conventional "C" ring clip design contains inwardly bent tabs or other readily projecting parts which precludes its use in the relatively small annular space. A particular disadvantage of the "C" ring clip is that the frictional resistance or positioning force of similar ring clips has a wide range of variability due to the lack of perfect circular geometry between the ring and tube contacting surfaces. Consistency in frictional resistance between the contacting surfaces is not always attainable with the result that either too little or too much resistance is presented to pellet stack growth.

Although no springs or other means have been used to hold neutron absorbing pellets in the annular space, the foregoing discussion shows that springs of different designs have been positioned in the plenum of fuel rods to hold fuel pellets in position during shipment. Conventional coil springs are widely used. U.S. Pat. No. 4,080,253 assigned to the same assignee as the present invention, discloses the C-shaped spring discussed above. Also, U.S. Pat. No. 4,054,487 discloses a leaf spring located in the space provided by the inner wall of a fuel rod and the outer surface of fuel pellets, but its design and function are different from that set forth in this disclosure.

SUMMARY OF THE INVENTION

Briefly stated, the above disadvantages of the prior art are overcome by this invention by providing a C-shaped polygonal ring of a size sufficient to fit in the intertubular or annular space between the facing surfaces of concentrically disposed tubes. The ring is circular on the inside so as to have it conform to the outer surface of the inner tube while the outer surface of the ring clip contains spaced projections which contact the outer tube inner surface to provide the necessary degree of frictional force required to hold the clip in position. This action minimized gaps which might occur between adjacent pellets by providing a compacting force which tends to hold the pellets together, while still permitting slippage between the clip and tube surfaces as the pellet stack grows. The frictional resistance of the spring clips can be varied by changing the thickness of flat sides which act as a bridge between spaced projections of circular configuration which engage the tube walls. It will occur to those skilled in the art that many different designs and configurations of spring clips which fall within the scope of this invention can be made to provide the function of holding a stack of pellets in a relatively compressed condition while still providing sufficient frictional force to just permit clip slippage as growth of such pellets occur as they are exposed to the irradiation effects in a nuclear reactor.

BRIEF DESCRIPTION OF THE DRAWINGS

While the foregoing discussion identifies problems presently existing in the prior art together with a general description of how they may be overcome, it is believed the following disclosure of the preferred embodiment of the invention will be better understood by reference to the accompanying drawings wherein.

DESCRIPTION OF THE PREFERRED EMBODIMENT

Figure 1:
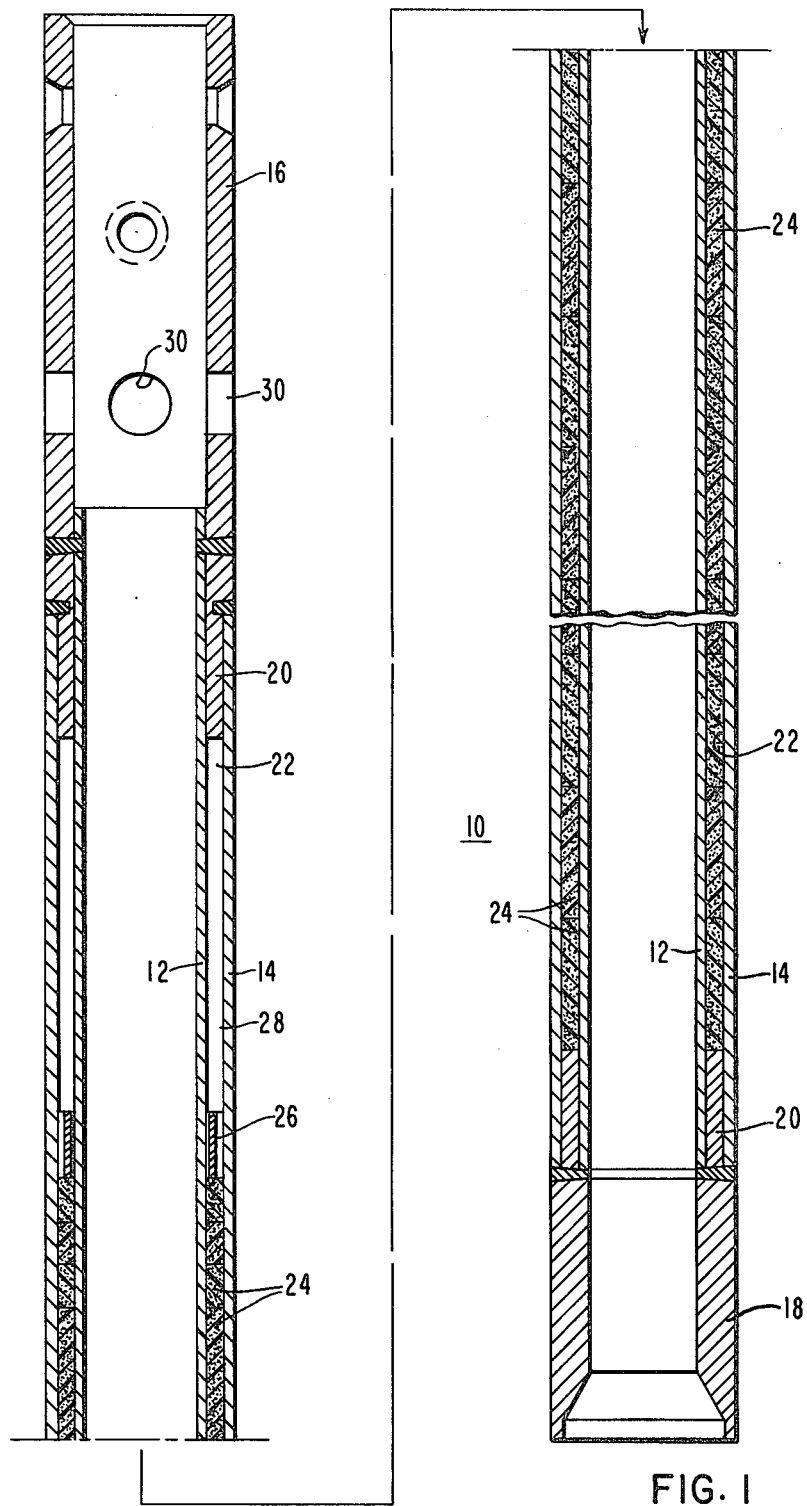
FIG. 1 is a view in elevation, partly in section of a burnable poison rod which will accept the spring clip of this invention.

Referring now to the drawings wherein like reference characters designate like or corresponding parts throughout the several views, there is shown a burnable poison rod 10 which includes a pair of concentrically disposed stainless steel, zircaloy or other tubes 12, 14. Opposite ends of the rod are closed by end plugs 16, 18 which are designed to include an inwardly extending member 20 which precisely fits into the space 22 between the concentrically disposed tubes. This annular space 22 is of a width just about equal to the wall thickness of a plurality of neutron absorbing burnable poison pellets 24 stacked along the rod length. A burnable poison pellet positioning device in a form of a spring clip 26 is positioned in the annular space above the pellets and acts to provide a slight compressive force on the pellet stack to eliminate gaps between pellets and thereby protect the pellets against fracture during the time the rod is being handled and shipped, either separately or in a fuel assembly.

The pellets preferably are made of boron carbide in a binder of resin, although other neutron absorbing material having sufficient strength to withstand the shock forces to which the rod may be exposed, may be used. Since the pellet stack will increase in length as it increases in temperature and undergoes irradiation, a plenum 28 is provided above the pellet stack to accommodate such growth and accept gases which may appear in the annular space. Also, since the rod will be exposed to the pressure of reactor coolant which normally is 2250 psig, the plenum space 22 is pressurized after the end plugs are welded in position. As noted above, the lower end plug has a central opening which permits the flow of reactor coolant upwardly through the rod prior to being discharged through radial openings 30 in the side walls of the top end plug.

Figure 3:
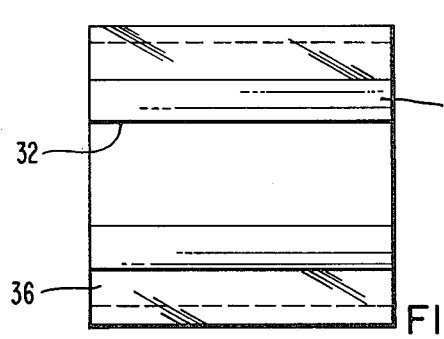
FIG. 3 is a side view of the spring clip illustrated in FIG. 2.
Figure 2:
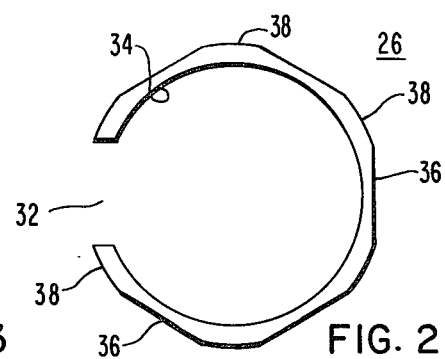
FIG. 2 is an end view of the spring clip of this invention.

Referring to FIGS. 2 and 3, the spring clip 26 shown is designed to coact with the tube surfaces to hold the pellet stack in position. It consists of a C-shape polygonal ring which is interrupted along its circumferential length to provide a gap 32. In a preferred embodiment used to illustrate the invention, the ring has a length of 0.375 inch with an outer diameter of 0.360 inch and a wall thickness at its thickest point being 0.022 inch, which is slightly less than the radical dimension of the annular space 22 between the concentrically disposed tubes 12, 14. The spring clip has an inner diameter such that a slight clearance exists between it and the outer surface of inner tube 12, and the slot or gap 32 imparts flexibility to the clip body. Its outer surface is of polygonal configuration and includes alternating flat sides 36 and circular projections 38 on the clip outer surface. The alternating flat and circular areas are the features which distinguish this spring clip from similar springs heretofore used in containing pellets in rods used in fuel assemblies. The circular projections 38 precisely conform to the inside curvature of the outer tube and thus provide a controlled number of contacts between the clip and tube inner surface, and the degree of surface contact force provided determines the amount of resistance offered by the clip-to-pellet stack movement.

Developmental work shows that a simple round ring of uniform cross-section in the annular space will not perform the needed functions. If the wall thickness of the ring is not changed, the clip will be too stiff and will not slide on the tube walls as stack axial movement takes place. Pellets will fracture and fragment as a result of this action. Decreasing the wall thickness to overcome excessive stiffness results in a knife edge on the clip lower end which will also damage the pellets.

To overcome these disadvantages, the clip is made to an inner diameter just sufficient to slide over the inner tube, and the outer diameter is made slightly larger than the inner diameter of outer tube. A gap 32 is incorporated in the clip as described above. Optimum performance of the clip in the annular space is achieved by the number and thickness of the alternating flats 36 so that resistance between the clip and outer tube is just overcome when the clip is subjected to the axial forces supplied by the pellet stack as it grows when exposed to thermal and irradiation conditions in the reactor. Also, for the size of burnable poison rod disclosed herein, the maximum amount of force needed to seat the clip is about 40 lbs. The radial force between clip and outer tube inner wall also must be sufficient to hold the pellet stack from moving under a force of 6 g's since this is the greatest force expected to be imposed on the rod during handling and shipping.

This optimum design of spring clip is achieved by cutting the clip from stock Inconel or other tubing capable of withstanding the heat and radiation effects in an operating reactor. The cut tubing section shown is of hexagonal configuration. It is 0.375" long and gap 32 is 0.125 wide. The sides 38 on the outer surface are formed by milling material from the tube outer surface to provide a side wall thickness of 0.010"±002". Doing so leaves circular sections 38 between the flats which have surfaces complementary to the outer tube inner surface. Removing material from the clip circumference directly reduces the clip strength circumferentially and thus the amount of radial force that may be applied to the outer tube inner walls by circular sections 38. It will be apparent that the radial force can be varied by utilizing a large number of flats and corresponding circular projections and/or varying the clip wall thickness.

A particular advantage flowing from the design is that a relatively large surface area on the clip end is available to contact the exposed end surface of the top pellet in the stack. An end view of the clip shows the thickness of circular projections which are sufficient to eliminate the disadvantages of a knife edge which otherwise would appear on the end of a tube having a thin and uniform wall thickness. Since the projections are relatively thick in cross-section compared to the flat sides a substantial portion of the end surface area of the clip is in engagement with the end pellet. As the pellet stack expands during reactor operation, the stack axial forces are transmitted through the top pellet to the clip where they are uniformly distributed through the clip body. When the stack axial forces reach a predetermined amount which is less than the amount at which a pellet will fracture, the resistance between the clip circular projections and outer tube inner wall will be overcome and the clip will slide and thus move upwardly a slight distance in the annular space thereby accommodating the stack forces while protecting the pellets against fracture.

Clip 26 desirably is made of tubular material having known characteristics so that the amount of force radially directed against the rod can be determined by the number and thickness of flat areas. It will be apparent to those skilled in the art that the wall thickness will need to be greater for larger diameter spring clips than smaller ones. Also, as the number of flat sides increase, the greater will be the radial force on the tube 14 walls and the gap 32 will therefore not close as much as with smaller diameter clips.

Since multiple clips can be inexpensively fabricated from the same length of tubing, thermal expansion effects can be better controlled and fabrication techniques can be adapted for large or small quantities. Compared to a coil spring, it is evident that installation in the rod is relatively quick and easy. Also, compared to a coil spring, the clip does not apply an axial force on the opposing end plugs during rod assembly and welding of the end plugs.

Figure 4:
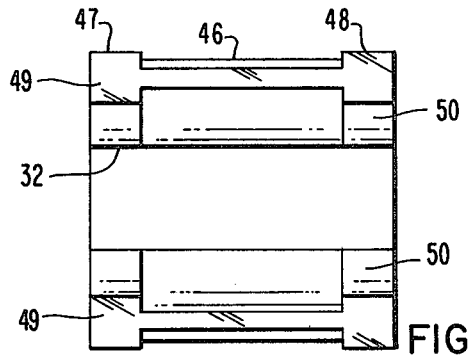
FIG. 4 is a modification of the spring clip showing how the walls of the clip may be milled to provide a thinner wall thickness and thus change the retentivity force imposed on the stack of pellets.
Figure 5:
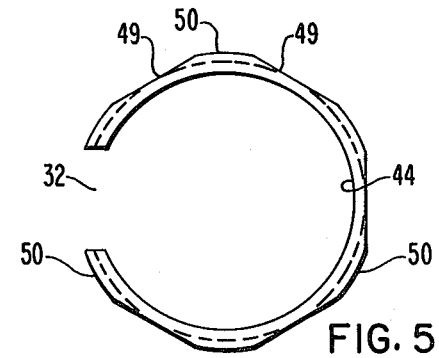
FIG. 5 is an end view of the spring clip shown in FIG. 4.

After having conceived the concept of utilizing flat and circular areas to establish spring clip retentive forces on the pellet stack, and for providing a relatively large surface area to contact the end of the pellet stack, it becomes obvious that many different designs and configurations of clip will occur to those skilled in the art. For example, FIGS. 4 and 5 show a design of spring clip wherein the radial or retentive forces have been minimized to a considerable extent. Examination of an end view of the clip shown in FIGS. 4 and 5 will show that it has the same configuration as the end of the clip of FIGS. 2 and 3. However, to achieve the application of lesser radial force against the outer tube inner surface, the clip has a uniform inner diameter 44 and gap 32 as before. The clip outer surface includes a body 46 having a pair of rings 47, 48 formed on opposite ends thereof. Flat sides 49 are milled in the rings 47, 48 to a depth sufficient to also remove a small amount of material from the body 46 to form flat surfaces of I beam configuration. The remaining circular projections 50 have the same curvature as the outer tube inner surface. The reduction in material thus results in a lesser stiffness and thus lessens the radial force against the outer tube. Because of the reduction, the flat sides 49 do not contain as great a surface area, but since the flat areas are used only for controlling stiffness, it will not adversely affect clip performance in the rod. Although the design of FIGS. 4 and 5 appears substantially different than the FIGS. 2 and 3 design, the flat and circular areas still perform the same function.

Figure 6:
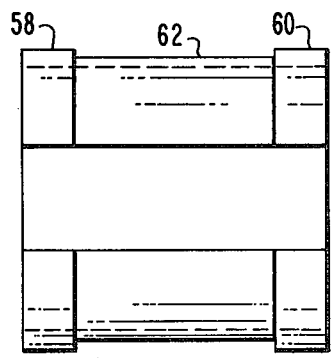
FIG. 6 is still another modification illustrating how the wall thickness may be varied throughout the complete circumferential length of the clip.
Figure 7:
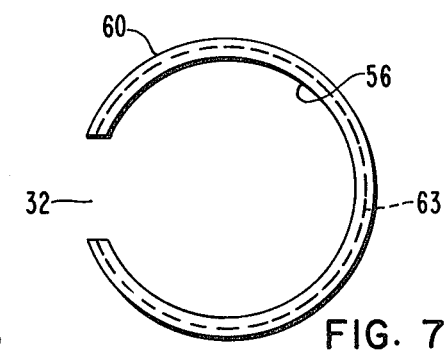
FIG. 7 is an end view of the clip shown in FIG. 6.

In the modification of the spring clip shown in FIGS. 6 and 7, the inner diameter 56 is uniform throughout its circumferential length while the outer diameter of both circular ends 58, 60 is greater than the central body 62 of the clip which bridges the circular ends. This design still provides for a relatively large surface area which contacts the end of the top pellet, but variation in the retentive force applied by the spring clip to the pellet stack is varied by varying the thickness of wall 63 between the two opposed circular ends, and thus control the resistance between the clip and outer tube inner surface.

Figure 8:
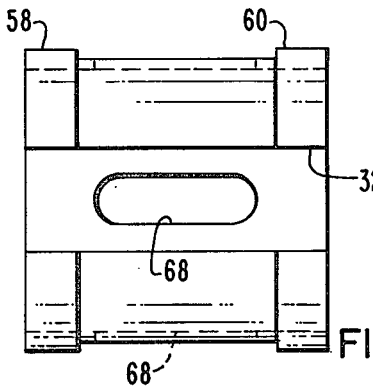
FIG. 8 is another modification wherein the retentivity force in the spring clip may be varied by introducing holes which extend through the walls of the clip body.
Figure 9:
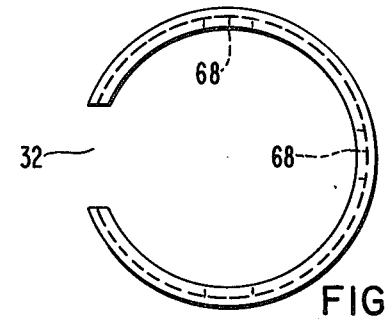
FIG. 9 is an end view of the clip illustrated in FIG. 6.

The modification in FIGS. 8 and 9 is similar to FIGS. 6 and 7 except the clip body 46 is provided with slots 68 around the clip periphery. Removal of material from the clip in this manner provides a construction which does not have the same degree of retentive force as a spring clip which does not have any slots in the spring clip body.

It will be apparent that many modifications and variations are possible in light of the above teachings. It therefore is to be understood that within the scope of the appended claims, the invention may be practiced other than as specifically described.

We claim:

1. A burnable poison rod for use in a nuclear reactor fuel assembly comprising a pair of concentrically disposed tubes having an annular space therebetween, neutron absorbing pellets in said space, and means in opposite ends of the rod for sealing the space containing said pellets, and pellet stack retaining means in said space at one end of the rod for helping eliminate gaps between pellets and for releasably holding said pellets against longitudinal movement in the space when the rod is subjected to externally imposed forces, said retaining means being arranged to bear against the end pellet in said stack while imposing radially directed forces against the surface of one of said tubes for frictionally holding the retaining means in position, and said pellet stack retaining means including a C-shape spring clip having a gap extending completely through the clip wall in an axial direction, said clip having an inner surface complementary to the inner tube outer surface, and its outer surface shaped to provide less than full surface contact with the outer tube inner walls, the walls of said clip having a thickness which corresponds with the radial force desired to be applied to the outer tube inner walls in order to hold the stacked pellets in position; and wherein the spring clip is generally circular on the inside and has multiple alternating flat and circular areas on the outside, with its radial dimensions generally constant along its length, the flat areas of said clip being shaped to impart a retention force to the clip when the clip engages the outer tube inner surface, and the circular areas having a curvature matching the outer tube inner surface, said circular areas being arranged for surface contact with the outer tube inner walls to provide a frictional force which releasably holds said pellet stack against axial movement.

2. A burnable poison rod for use in a nuclear reactor fuel assembly comprising a pair of concentrically disposed tubes having an annular space therebetween, neutron absorbing pellets in said space, and means in opposite ends of the rod for sealing the space containing said pellets, and pellet stack retaining means in said space at one end of the rod for helping eliminate gaps between pellets and for releasably holding said pellets against longitudinal movement in the space when the rod is subjected to externally imposed forces, said retaining means being arranged to bear against the end pellet in said stack while imposing radially directed forces against the surface of one of said tubes for frictionally holding the retaining means in position, and said pellet stack retaining means including a C-shape spring clip having a gap extending completely through the clip wall in an axial direction, said clip having an inner surface complementary to the inner tube outer surface, and its outer surface shaped to provide less than full surface contact with the outer tube inner walls, the walls of said clip having a thickness which corresponds with the radial force desired to be applied to the outer tube inner walls in order to hold the stacked pellets in position; and wherein the spring clip includes a cylindrical body having uniform inner and outer diameters having dimensions constant along the length thereof, a pair of outwardly projecting rings on opposite ends of said body, said rings having a greater outer diameter than said body, said rings having multiple alternating flat and circular areas on the outside with the circular areas having a curvature matching the outer tube inner surface, said circular areas being arranged to engage the outer tube inner walls with a radial force determined by the wall thickness of said body, said force being effective to provide resistance between the spring clip and tube walls to thereby inhibit pellet stack axial movement.

* * * * *